United States Patent [19]
Zenk et al.

[11] 4,085,302
[45] Apr. 18, 1978

[54] MEMBRANE-TYPE TOUCH PANEL

[75] Inventors: George Edward Zenk, Richfield; Robert Joseph Johnson, Inver Grove Heights; Charles Newell Miller, Richfield, all of Minn.

[73] Assignee: Control Data Corporation, Minneapolis, Minn.

[21] Appl. No.: 743,992

[22] Filed: Nov. 22, 1976

[51] Int. Cl.² ............................................ H01H 13/52
[52] U.S. Cl. ............................. 200/5 A; 200/159 B; 307/115, 340/365 R
[58] Field of Search ............... 307/116, 117, 115; 340/324 R, 166 R, 324 A, 365 R, 365 C, 365 A; 178/18, 20; 313/462, 478, 474; 338/114, 2, 5; 200/5 A, 159 B

[56] References Cited
U.S. PATENT DOCUMENTS

| | | | |
|---|---|---|---|
| 3,503,031 | 3/1970 | Nyhus et al. | 340/365 A |
| 3,707,715 | 12/1972 | Perotto | 178/18 |
| 3,760,360 | 9/1973 | Reynolds et al. | 340/166 R |
| 3,935,485 | 1/1976 | Yoshida et al. | 340/365 A |
| 4,017,848 | 4/1977 | Tannas | 340/365 R |

*Primary Examiner*—Robert K. Schaefer
*Assistant Examiner*—Morris Ginsburg
*Attorney, Agent, or Firm*—Edward L. Schwarz

[57] ABSTRACT

A location sensitive touch panel for use on a rigid substrate. The substrate carries a first set of conductive strips. A resilient plastic membrane overlaying it carries a second set of conductive strips orthogonal to and spaced from the first set. Finger pressure can cause electrical contact between any one of the first set of strips and any one of the second set of strips. The substrate may be either flat or curved, with the membrane conforming to its contour.

11 Claims, 5 Drawing Figures

U.S. Patent    April 18, 1978    4,085,302
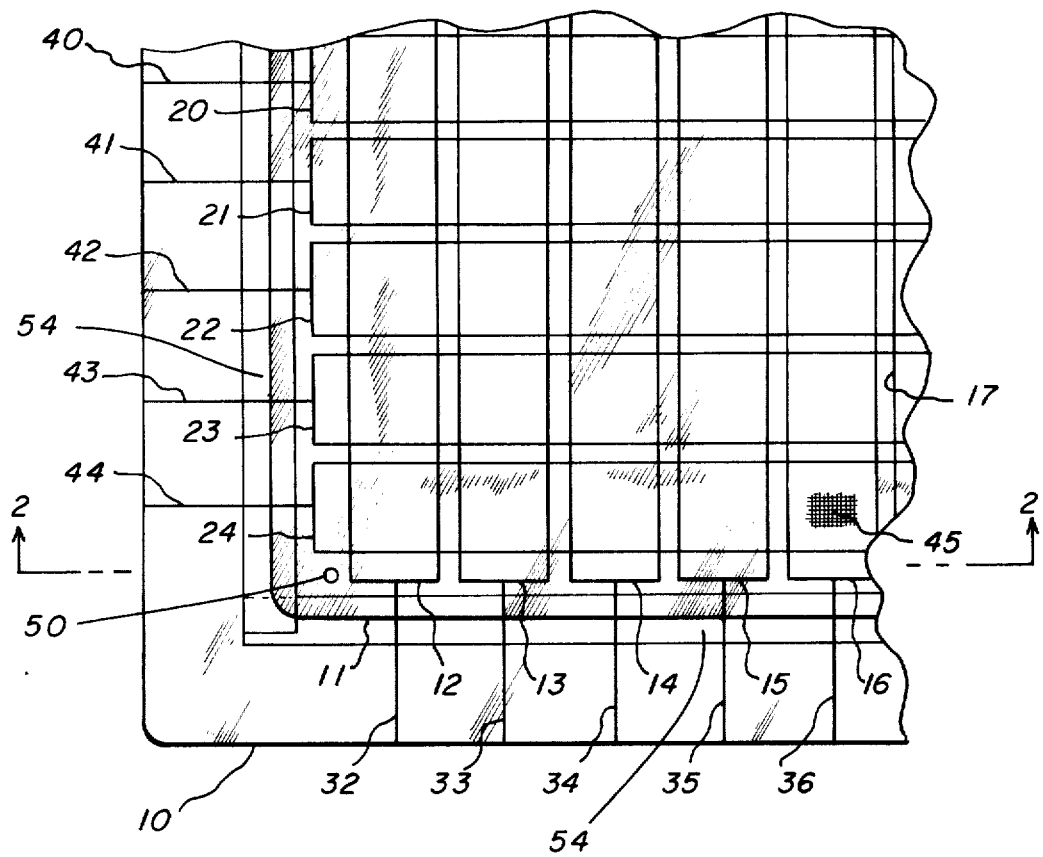
FIG. 1
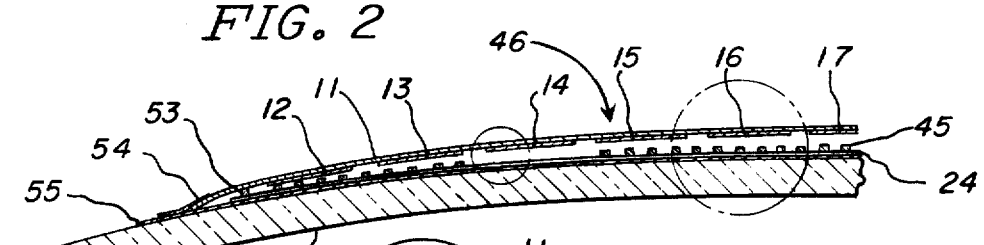
FIG. 2
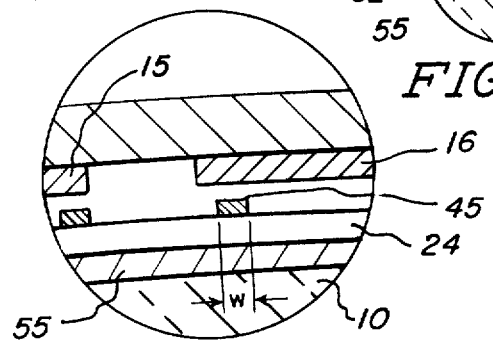
FIG. 4
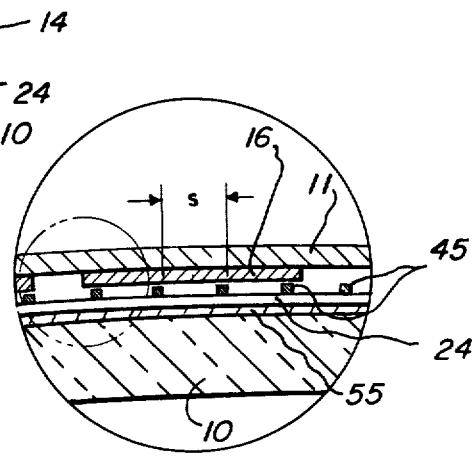
FIG. 5
FIG. 3

MEMBRANE-TYPE TOUCH PANEL

BACKGROUND OF THE INVENTION

The invention is a touch panel device which electrically indicates the X-Y coordinates of contact of an operator's finger on it and is sensitive to pressure only. Frequently, information is displayed on a substrate beneath the touch panel as well. The coordinates of a contact can be related to the displayed information thus providing for interactive communication between the operator and the device of which the touch panel forms a part.

The prior art includes a variety of techniques for sensing the location of contact on a surface. The most similar device of which the inventors are aware is the stretched drumhead type of membrane. This device employs a membrane spaced from a flat substrate and which can be deflected to cause conductors carried on it to contact those on the substrate. Another device is disclosed in an article entitled "CRT Touch Panels Provide Maximum Flexibility in Computer Interaction", Control Engineering, July 1976, pp. 33-34. This article discloses a curved flexible plastic sheet carrying small wires. The sheet can be deflected to cause these wires to come into contact with an orthogonal set of similar wires mounted immediately below. Spacers separate the sets of wires. U.S. Pat. No. 3,760,360 discloses a quite similar device embodied in a flat panel but having no capability of interactively displaying information. U.S. Pat. No. 3,495,232 discloses a somewhat simpler embodiment of a similar device. U.S. Pat. No. 3,921,167 discloses a panel location-sensitive to the approach of an external probe sensing change in capacitance.

BRIEF DESCRIPTION OF THE INVENTION

The touch panel covers a rigid substrate, whose face has a predetermined radius of curvature ranging from infinite (flat) to 25 inches or less, and comprises in part a resilient membrane of a contour conforming to the substrate face and attached about its periphery thereto. A group of discrete conductive strips adheres to the substrate on the surface facing the membrane. A second group of discrete conductive strips which flex with the membrane and which cross the first, is carried by the membrane on its surface facing the substrate. External pressure on a local area of the membrane forces one or more conductive strips on the membrane into electrical contact with one or more conductive strips on the substrate. By detecting which strips are in contact with each other, the approximate coordinates of the pressure point on the membrane can be determined. To prevent shorting between strips of each group when no external pressure is present, any one of several means can be used. In one embodiment, a thin, transparent insulating grid is interposed between the two groups of conductive strips. A piezo-resistant coating on the surfaces of at least one group of strips also appears to function satisfactorily. When a curved substrate is used, a third anti-short means involves making the radius of curvature of the membrane somewhat smaller than the substrate's. Then the natural resilience of the membrane is sufficient to support the conductive strips carried by it spaced from the substrate's conductive strips with no interposed element.

In one preferred embodiment, the rigid substrate comprises a curved CRT faceplate or screen, with a resilient membrane curved to conform to the CRT screen. The conductive strips both on the substrate and the membrane are sufficiently thin so as to be transparent and permit viewing of information displayed on the CRT screen. Being transparent, the conductive strips can be relatively wide with respect to the spacing between adjacent ones on the same surface and thus permit a larger area of contact. The anti-short means comprise an insulating grid preferably formed of one of several photo-resist polymers now available, thus allowing the grid to be formed in situ on either the substrate or the membrane by masking and exposing to light, followed by the appropriate chemical process. Such photo-resist materials at the small thicknesses contemplated are substantially transparent.

Accordingly, one purpose of this invention is to provide a passive surface sensitive to low pressure from a finger or stylus.

A second purpose is to provide a touch panel permitting the viewing of a display beneath it.

Another purpose is to provide a touch panel which can be easily integrated with existing display designs.

BRIEF DESCRIPTION OF THE DRAWINGS

FIG. 1 is a plan view of a corner portion of a typical touch panel assembly, flat or curved, embodying the invention.

FIG. 2 is a cross section of a curved embodiment of the touch panel displayed in FIG. 1 and incorporating a membrane having a slightly smaller radius of curvature than the substrate.

FIG. 3 is a blowup of a portion of FIG. 2 detailing the relationship of the two sets of conductor strips and the insulating grid (when present).

FIG. 4 is a blowup of a portion of FIG. 3 showing in still greater detail the relationship of the two sets of conducting strips and the insulating grid.

FIG. 5 is a blowup of a portion of FIG. 2 employing a piezo-resistant anti-short means.

In all of these drawings scale between the various parts is not always consistent as this simplifies understanding. Suitable dimensions for the elements of the structure are set out below as needed.

DESCRIPTION OF THE PREFERRED EMBODIMENTS

The corner portion of the preferred embodiment shown in FIG. 1 comprises a base or substrate 10 which may be flat or, as in FIG. 2, curved. Substrate 10 must have an insulating surface. Y conductive strips 20-24 comprise transparent coated areas firmly adhering to the surface of substrate 10 facing the viewer. In a typical application substrate 10 can at least partly comprise a CRT screen. It may not be convenient to directly apply conductive strips to a CRT screen or other substrate, but rather form them on a clear plastic sheet 55, curved if intended to conform to a curved CRT screen, which is then glued or otherwise attached to substrate 10. Leads 40-44 are attached to ends of strips 20-24 respectively so as to make electrical contact between them and external support electronics. In a typical device, each of conductive strips 20-24 is 0.5 in. wide and is separated from adjacent strips by 0.005 in. gaps. Strips 20-24 are in one embodiment preferably formed from indium oxide, tin oxide, or a combination of both oxides. The strips are easily formed by coating the entire face of substrate 10 with the conductive material using standard techniques. Standard etching technique using photo-resist material then forms the narrow gaps between adjacent strips.

In one embodiment of this invention, insulating grid 45 forms the next layer of the panel, overlaying at least a portion of conductive strips 20-24, and usually covers strips 20-24 uniformly. When such an insulating grid is used, it can be most easily formed from widely available and well known transparent photo-resist material which is itself inherently non-conductive. The areas to be covered by insulating grid 45 are covered with the photo-resist material, an appropriate mask is placed on these areas, the resist is exposed according to usual procedures, and the unexposed photo-resist is removed with standard chemical procedures. A suitable grid 45 comprises a crosshatch of lines or strips formed of the photo-resist material, where each line is 0.005 in. wide (w in FIG. 4) and all lines, in both the vertical and horizontal directions are on 0.025 in. centers (s in FIG. 3). Thickness of insulating grid 45 can vary depending on the pressure desired to form contact, but a nominal value of 0.0001 in. appears to be suitable for the 0.003 MYLAR (reg. trademark of Dupont Corp.) polyester membrane described below. In general, a ratio of from 1:5 to 1:100 for the width w of the insulating grid lines to the centerline spacing s of adjacent pairs is suitable for this grid thickness. The width w of individual lines should never exceed a few thousandths of an inch. Insulating grid 45 can also be formed on membrane 11 after strips 12-16 are formed as described below.

Resilient insulating membrane 11 forms the tactile surface which the operator presses at a desired point to create an electrical contact indicating the coordinates of the pressure point. Membrane 11 carries conductive strips 12-16 on its surface facing substrate 10, which strips are formed before attaching membrane 11 to substrate 10. Strips 12-16 must be flexible enough to easily bend with membrane 11. Transparent polyester film of 0.003 in. thickness with a transparent conductive gold film on one surface available from Sierracin Corp., 12780 San Fernando Road, Sylmar, CA, 91342 is suitable, as well as other thicknesses to at least 0.007 in. Conductive strips 12-16 are conveniently formed by removing (through etching) narrow strips of gold in parallel lines from such a film. Typical dimensions of the gold-free lines defining gold strips 12-16 are 0.002 in. on 0.5 in. centers. Vent 50 allows membrane 11 to assume its natural shape more quickly after pressure on it by allowing air to rapidly flow into the space between membrane 11 and substrate 10. It may be desirable to place a filter in vent 50 to prevent the entrance of dirt. This vent prevents the slow return of membrane 11 to its natural shape when deflected over a large area at one instant. It also prevents shorts caused by changes in ambient atmospheric pressure.

If substrate 10 is curved, it is necessary to mold membrane 11 and strips 12-16 already formed on it to a smooth contour which conforms to substrate 10. This in itself is not a trivial problem for the polyester film involved and forms the subject of co-pending Application Ser. No. 735,490 filed Oct. 26, 1976 by Charles Miller, and entitled "A Method For Forming Curved Plastic Film From a Flat Film." Membrane 11, after etching of the gold layer to form conductive strips 12-16, is formed according to this method into a shape substantially conforming to the topology of substrate 10. If substrate 10 is curved it is preferable that the curvature of membrane 11 when unstressed be slightly greater than that of substrate 10. When substrate 10 comprises a typical curved CRT implosion shield, curvature is approximately spherical with a radius of approximately 20-30 in. In such a case membrane 11 preferably is molded to a radius of curvature of from 1-4 in. less than that of substrate 10. The slightly greater curvature prevents strips 12-16 on membrane 11 from being drawn down tightly onto strips 20-24 and possibly shorting to them. Further, such dimensioning is essential if anti-short means other than grid 45 are employed on a curved substrate, as described infra. Membrane 11 is securely fastened around its periphery to substrate 10 by tape strips 54 in such a position that conductive strips 12-16 pass across each of conductive strips 20-24 and are spaced therefrom by grid 45 and the natural tendency of membrane 11 to assume its molded-in spherical shape when unstressed. Conductive strips 12-16 are connected to leads 32-36 by a conductive adhesive. Leads 32-36 may be formed in situ on substrate 10 at the same time conductive strips 20-24 are formed. The support electronics can thus be easily connected to strips 12-16. Spacer 53 (FIG. 2), though often not essential, can be employed advantageously in certain cases to prevent shorting around the periphery of membrane 11, particularly if anti-short means other than grid 45 are used. Spacer 53 need not be placed on strips 20-24 and may extend to the edge of membrane 11.

In operation, a contact between any one of conductive strips 20-24 and any one of conductive strips 12-16 can be made by gentle finger or stylus pressure on membrane 11 above the desired point of intersection. Because of the relatively wide contact surfaces the pressure point need not be precisely in the center of the desired intersection. With either insulating grid 45 or the other anti-short means described infra, gentle finger pressure forms an essentially zero resistance contact between the two selected strips. The wide contact surfaces also add reliability in forming each contact between the strips.

FIG. 5 discloses one alternative to insulating grid 45 as the anti-short means. The aforementioned gold covered polyester film from Sierracin Corp. is available optionally with a "proprietary ceramic coating which serves to increase visible light transmission and to provide a measure of mechanical protection to the conductive metal deposit". (Sierracin Corp. brochure entitled Sierracin Intrex (TM) Electrically Conductive Film Components.) This coating has been determined to have a piezoresistant characteristic of high resistance under very light pressure, and a very low resistance under pressure no heavier than that generated by gentle finger pressure. In FIG. 5, coatings 51 and 52 indicate use of this alternative. As now available, both coating 51 and 52 must be present to yield sufficiently high resistance at very low pressures to allow functioning as an anti-short means. It is probably that a coating 51 thicker than now available would allow omission of coating 52. As previously mentioned, when no insulating grid 45 is used, spacer 53 may be necessary to prevent shorting adjacent the edges.

Another means for preventing shorting between the X and Y conductor strips 12-16 and 20-24 is available for use with a substrate 10 having a finite radius of curvature. By selecting membrance 11's radius of curvature smaller than substrate 10's (for membranes mounted on substrate 10's convex side, of course), as shown in FIG. 2, the natural resiliency of membrane 11 and its arched shape supports X strips 12-16 in spaced relationship with Y strips 20-24 and prevents their shorting absent external pressure. Although a wide variety of radii of curvature will undoubtedly work, it is known that a substrate of 25 in. radius of curvature and a 0.003 in thick polyester membrane molded with a form having a 22 in. radius of curvature are satisfactory. As shown in FIGS. 1 and 2, it is desirable with this anti-short means, to bond the periphery of membrane 11 to substrate 10 outside Y strips 20-24 to increase the clearance between the peripheral X and Y strip, areas. Spacer 53 may also be used for this purpose. It is likely, although not confirmed, that use of membrane 11's natural resiliency and curvature to provide the necessary anti-short spacing between X and Y strips requires a greater difference in radii of curvature for substrate 10 and membrane 11 than do the previously mentioned anti-short means. Thus, while a 3 in. smaller radius works with a 25 in. substrate radius in all 3 cases, a 1 in. difference or less may well be satisfactory when grid 45 or piezoresistant coating 51 is used.

During the manufacture of this apparatus, it is important that the surfaces of strips 20-24 and 12-16 be relatively free of dust and other foreign matter during attachment of membrane 11 to substrate 10. However, the relatively wide contact areas between crossing strips does tolerate a small amount of such foreign matter, particularly as long as the foreign matter is non-conductive.

The preceding describes the invention; what is claimed is:

1. A switch matrix to be carried on the face of a rigid insulator substrate having a predetermined radius of curvature, and comprising:
   a. a plurality of spaced apart conductive first strips firmly adhering to the face of the substrate;
   b. a resilient insulating membrane having an undistorted curved contour substantially alike the predetermined contour of the substrate, and attached about its periphery to the face of the substrate in a position matching the membrane contour to the substrate contour and supported apart from the first strips thereon in a predetermined area of the membrane by the natural resilience of the curved contour; and
   c. a plurality of flexible, spaced apart conductive second strips firmly adhering to the resilient membrane surface facing the substrate, each of said second strips located in the area spaced apart from the first strips and thinner than the spacing therefrom, and each of said second strips crossing at least two first strips.

2. The switch matrix of claim 1 wherein the first and second strips and the membrane are all transparent.

3. The switch matrix of claim 1, wherein the first conductive strips are substantially parallel to each other the second strips are substantially parallel to each other, and the resilient membrane is oriented to place the second strips substantially orthogonal to the first strips.

4. The switch matrix of claim 1, wherein the substrate contour is convex, and wherein the contour of the membrane is slightly more convex than the contour of the substrate.

5. The switch matrix of claim 4 wherein the substrate contour is spherical.

6. The switch matrix of claim 5 wherein the contour of the membrane has a radius of curvature slightly smaller than that of the substrate.

7. The switch matrix of claim 6, wherein the membrane's radius of curvature is about 1 to 4 inches smaller than the substrate's.

8. The switch matrix of claim 7 wherein the substrate's radius of curvature is approximately 25 inches and the membrane's undistored radius of curvature is between about 21 and 24 inches.

9. The switch matrix of claim 1, wherein the resilient membrane comprises polyester film.

10. The switch matrix of claim 1, including an insulating sheet having a contour conforming to the substrate face and fastened thereto in a position matching the sheet's contour to the substrate, said sheet on the opposite face thereof carrying the first strips.

11. The switch matrix of claim 10, wherein the sheet, conductive strips, and membrane are all transparent.

* * * * *